(12) United States Patent
Pierman

(10) Patent No.: US 6,198,083 B1
(45) Date of Patent: Mar. 6, 2001

(54) METHOD AND APPARATUS FOR HEAT TREATING WIRES

(75) Inventor: Harvey H. Pierman, Montville, OH (US)

(73) Assignee: American Spring Wire Corp., Bedford Hts., OH (US)

(*) Notice: Subject to any disclaimer, the term of this patent is extended or adjusted under 35 U.S.C. 154(b) by 0 days.

(21) Appl. No.: 09/547,488

(22) Filed: Apr. 12, 2000

(51) Int. Cl.$^7$ ................................. H05B 6/44; H05B 6/10
(52) U.S. Cl. ................. 219/636; 219/656; 219/671; 219/672; 219/601; 148/568; 266/129
(58) Field of Search ................................. 219/636, 645, 219/646, 655, 656, 672, 674, 671, 662, 601; 148/568; 266/129

(56) References Cited

U.S. PATENT DOCUMENTS

| | | | | |
|---|---|---|---|---|
| 3,619,231 | * | 11/1971 | Johnson | 118/69 |
| 4,427,463 | * | 1/1984 | Spies | 148/129 |
| 4,574,604 | * | 3/1986 | Vogel et al. | 219/636 |
| 4,788,394 | * | 11/1988 | Vanneste et al. | 219/636 |
| 5,032,191 | * | 7/1991 | Reiniche | 148/16 |

* cited by examiner

Primary Examiner—Philip H. Leung
(74) Attorney, Agent, or Firm—Calfee, Halter & Griswold, LLP

(57) ABSTRACT

A process for heat treating steel wires in which the wires are passed through an induction furnace with induction coils connected in series to a common power supply. No more than one wire passes through any one of the induction coils. The wires are heated to their Curie temperature, where the wires become non-magnetic. This makes the process substantially self-regulating. If one or more wires are heated more rapidly than others, little if any heating of the more rapidly heated wires will occur after they reach their Curie temperature, and all wires will leave the inductive heating furnace at or near their Curie temperature. The system will operate satisfactorily with one or more wires missing. When this happens, for loading purposes or other reasons, the efficiency of the unit degrades but sufficient excess power remains such that heating of the wires that are passing through the system will be relatively unaffected at the design mass flow rate. After leaving the inductive furnace the wires pass through a non-inductive furnace, such as a muffle furnace, which heats the wires to an austenitizing temperature.

18 Claims, 2 Drawing Sheets

METHOD AND APPARATUS FOR HEAT TREATING WIRES

FIELD OF THE INVENTION

This invention relates to the heat treatment of wire, and more particularly to the heat treatment of high carbon steel spring wire by a combination of inductive heating and conventional heating.

BACKGROUND OF THE INVENTION

Wires of the production of various types of springs, including valve springs, compression springs, torsion springs and extension springs are normally heat treated to produce desired physical properties such as tensile and/or compressive strength, toughness and ductility. In typical processes the wires, which may contain 0.4–8% C, 0.0–1% CR, 0–3%Va, 0–2% Si, balance Fe, are heated to an austenitizing temperature, i.e., a temperature at which part or all of the wire is converted to austenite. This normally requires that the wire be heated to a temperature of about 1,500 to 1,800° F., depending upon the composition of the wire. The wire is then quenched in oil, water or other conventional quenching media to convert the material to martensite, then reheated and held at a temperature such as 600 to 1,200° F. to temper the wire and obtain the desired physical properties.

Furnaces for the continuous heat treatment of steel spring wires have included muffle furnaces, in which the wires pass through pipes or ducts filled with a controlled atmosphere, salt baths, silica fluid beds, and molten lead bath. Unfortunately, due to poor heat transfer characteristics, most of these conventional furnaces, with the exception of molten lead, require prolonged heating times, typically from 2 to 10 minutes, to heat wire to its austenitizing temperature.

Inductive heating has been proposed as a method for reducing the time required to heat these wires. Inductive heating at low to moderate frequencies will not heat this size range of wires to their austenitizing temperature efficiently because steel becomes non-magnetic at its Curie temperature of about 1350° F. The efficiency of conduction heating drops significantly past the wires Curie temperature and continued inductive heating requires large amounts of energy. However, wire can be heated to its austenitizing temperature more economically by heating the wire inductively to its Curie temperature and completing the heating process in a conventional furnace.

U.S. Pat. No. 4,788,394 to Vannese et al and U.S. Pat. No. 5,032,191 to Reiniche disclose processes for inductive heating of steel wire. In each, wires are passed through guides within the inductive heating chamber, with a coil surrounding all of the guides. Other proposed processes for inductive heating of wire also pass a number of wires through a common inductive heating coil. This has certain defects. The inductive heating system must be designed and adjusted for the bundle of wires as a whole, which complicates adjustment for any individual wire. If a wire is missing from the bundle, heating of the other wires can be affected adversely. For example, variations in the number or size of wire changes the conductive coupling properties of the coil, with resultant large and unpredictable variations in wire temperature.

SUMMARY OF THE INVENTION

This invention provides a continuous process for heat treating steel wires in which the wires are passed through an inductive furnace with induction coils connected in series to a common power supply. No more than one wire passes through any one of the induction coils. The wires are heated to their Curie temperature, where the wires become non-magnetic. This makes the process substantially self-regulating. If one or more wires are heated more rapidly than others, little if any heating of the more rapidly heated wires will occur after they reach their Curie temperature, and all wires will leave the inductive heating furnace at or near their Curie temperature.

The system is preferably operated, for reasons of efficiency, with a single wire passing through each induction coil. However, it will operate satisfactorily with one or more wires missing. If this happens the efficiency of the unit degrades, but sufficient excess power remains such that heating of the wires that are passing through the system will be relatively unaffected at the design mass flow rate. Again, the system is largely self-regulating, which provides significant operational advantages.

After leaving the inductive furnace the wires pass through a non-inductive furnace, such as a muffle furnace, which heats the wires to an austenitizing temperature. This combination of inductive and non-inductive heating heats the wires rapidly and efficiently, and provides highly desirable operational flexibility. Other features and advantages of this invention may be seen from the following detailed description.

DRAWINGS

DETAILED DESCRIPTION

Figure 1:
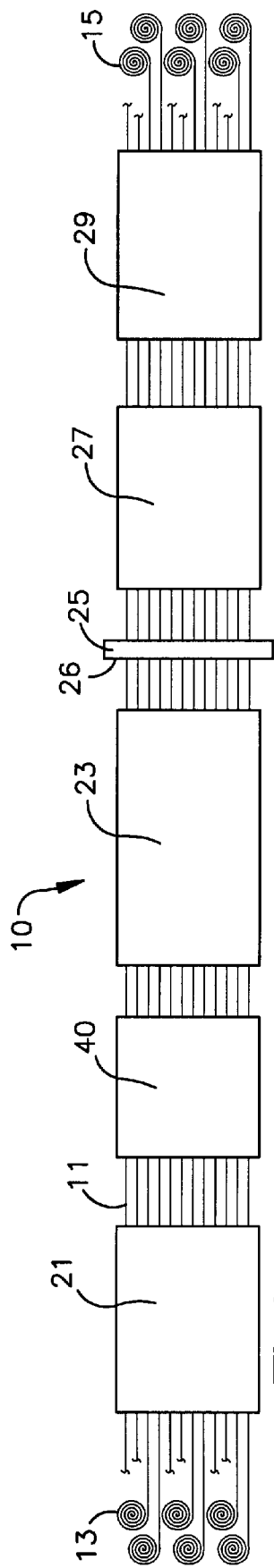
FIG. 1 is a schematic diagram of a system embodying this invention.

In the heat treating system illustrated in FIG. 1, referred to generally as 10, wire 11 is passed sequentially through an electrolytic cleaning bath 21, an inductive heating furnace 40, a conventional heating furnace such as a muffle furnace 23, a quench unit 27 and a tempering unit 29. Wire is supplied to the system from conventional pay-out reels 13, some of which are illustrated schematically in FIG. 1, typically containing an average of about 3,000 pounds of wire. As will be explained in more detail below, the wires may be of varying sizes, ranging from approximately 0.1 to 0.375 inches. The payout reels 13 are usually spaced from electrolytic cleaning bath 21 to allow room and time for operations such as welding the lead end of a wire on a new reel to the end of a wire on a reel that has been almost completely processed. This allows the system to operate essentially continuously.

Wires are pulled through the system by conventional take-up reels 15, some of which are illustrated in FIG. 1. The take-up reels 15 are driven by conventional variable speed motors (not shown) which allow the feed rates for the wires to be adjusted between about 10 and about 100 ft/min. The feed rates or the wires an be adjusted individually. As with the pay-out reels, the take-up reels are placed to allow room for wire to accumulate as a coil of wire is removed.

Wires from the pay off reels first pass through electrolytic cleaning bath 21, which removes drawing lubricant and contaminants that might plug tubes of muffle furnace 23 or otherwise foul the system. The cleaning bath also gives a clean wire surface so the tube atmosphere can react with the steel to form a tight adherent oxide on the surface of the wire.

Figure 4:
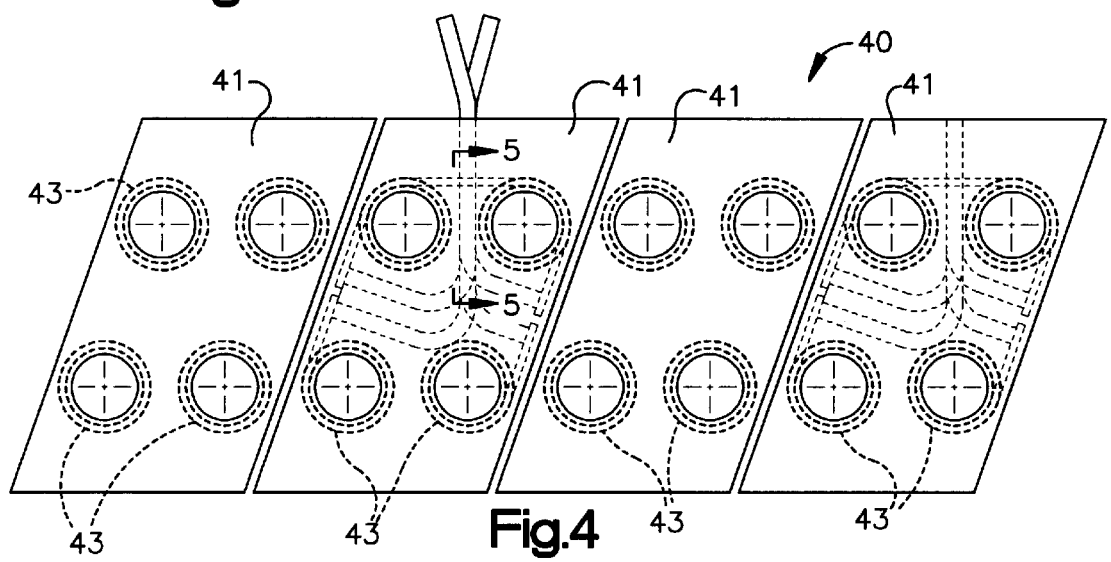
FIG. 4 is a front elevation view of the furnace in FIG. 3.

From electrolytic bath 21 the wire passes through inductive furnace 40, which is shown in more detail in FIGS. 2–5. As best seen in FIG. 4, inductive heating furnace 40 has four individual inductive heating units 41, each of which can process four wires. Thus, the system can process sixteen wires simultaneously.

Each inductive heating unit 41 contains four induction coils 43, each designed to treat a single wire. The coil for each individual wire is designed to heat 230 to 250 Lbs. of wire per hour to a temperature of 1,375° F. ±50° F. Wire speed is adjusted as wire diameter changes to maintain a mass thruput of 230–250 lbs/hr. through each coil. The high inductive power levels permit individual wire to be fed through the induction coils so that each wire reaches its Curie temperature as it exits the coil. Final wire temperature is controlled by the wire speed and the time the wire is resident in the muffle furnace. However, if one or more wires are heated more rapidly than others, the system is largely self-regulating. When a wire reaches its Curie temperature it becomes non-magnetic and little if any further heating occurs. Thus, all wires will leave the inductive heating furnace at or near their Curie temperature.

The system is preferably operated, for reasons of efficiency, with a single wire passing through each induction coil. Sufficient inductive power is applied so that each wire is heated well into saturation and to its Curie temperature. However, as illustrated schematically in FIG. 2, the system will operate satisfactorily with one or more wires missing. When this happens, for loading purposes or other reasons, the efficiency of the unit degrades but sufficient excess power remains such that heating of the wires that are passing through the system will be relatively unaffected at the mass flow rate of 230–250 pounds of wire per hour throughput.

Figure 2:
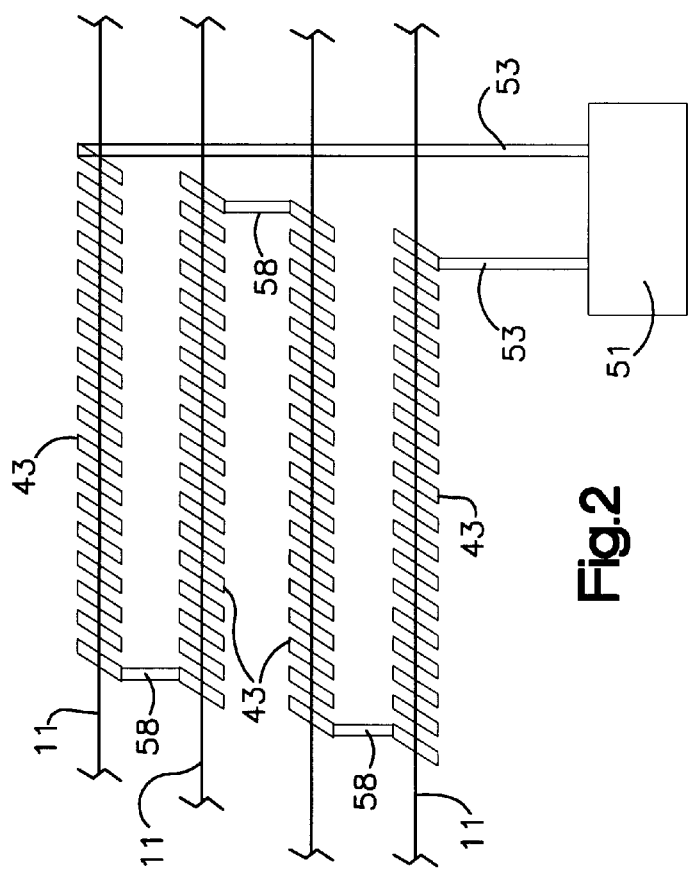
FIG. 2 is a schematic view of the induction coils for an inductive heating unit in the system of FIG. 1.
Figure 3:
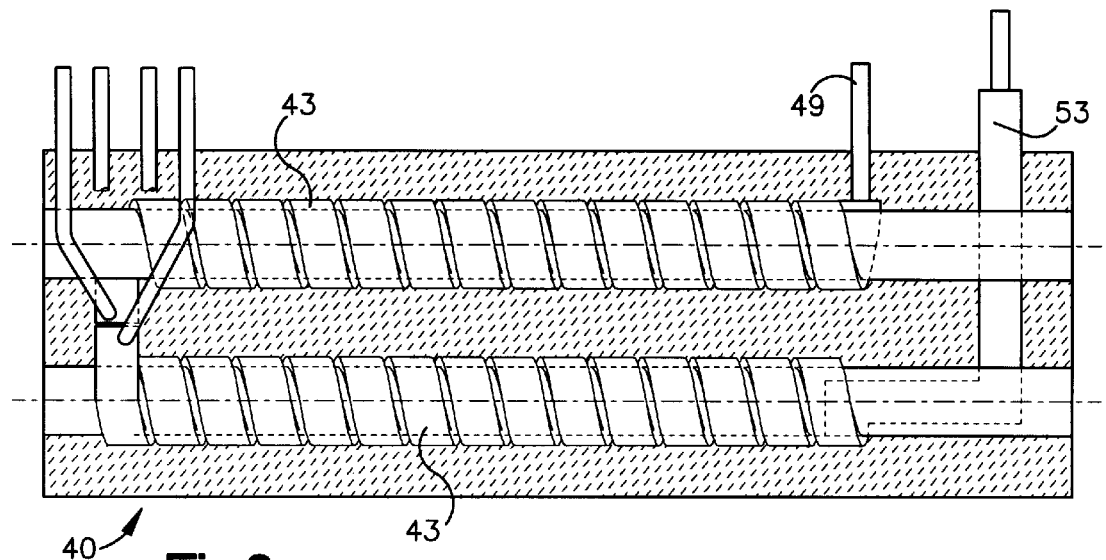
FIG. 3 is a partially broken away side elevation view of an inductive furnace for the system in FIG. 1.

As noted above, the system is largely self-regulating. The coils preferable have about 18 turns each, an inner diameter of about 2". As shown in FIG. 2, the coils 43 in each inductive heating unit are connected by bus bars 53 to a power supply 51. Each of the four inductive heating units 41 has its own separate power supply 51, preferably supplying electrical power at 10 kHz. Voltage and amperage vary as a function of wire diameter and speed. If wires smaller than 0.1 inch in diameter are processed, a higher frequency power supply may be required. As shown in FIG. 2, the coils 43 in each inductive heating unit are connected in series by busswork 58 so that current passes in opposite directions through adjacent coils. This cancels field effects and increases efficiency. Copper shielding may be used between the individual heating units 41 to reduce interference between the individual units.

Figure 5:
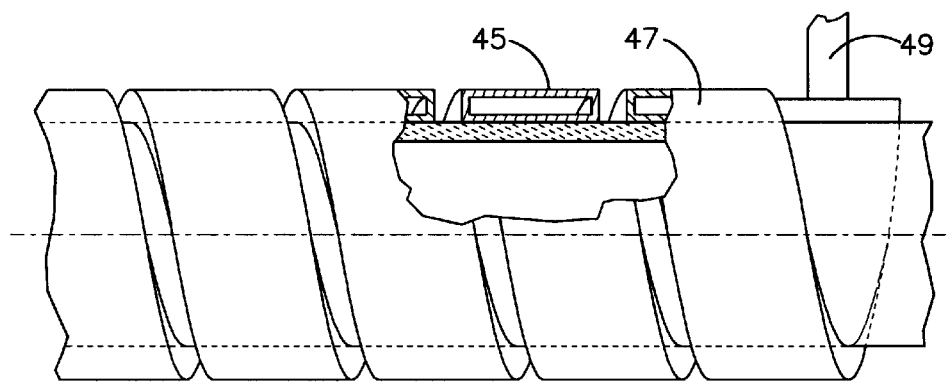
FIG. 5 is an enlarged cross-sectional fragmentary view, along lines 5—5 in FIG. 4, of an induction coil for the illustrated inductive furnace.

As best seen in FIG. 5, the induction coils have a rectangular shell 45 with a hollow core which provides a conduit 47 for cooling water. Ceramic tubes inside each coil isolate the wires being treated from the electric current. The entire assembly of four coils is cast in high temperature refractory. This insulates the outside of the coils and maintains coil spacing and alignment.

From the inductive heating furnace the wires pass through a conventional furnace such as a muffle furnace 23, which is illustrated schematically in FIG. 1. The muffle furnace has a series of tubes or conduits (one for each wire) passing through a heating chamber and isolating the wires from the products of combustion in the heating chamber, which is typically heated with natural gas or a similar inexpensive fuel. The atmosphere within the tubes of the muffle furnace may be controlled to avoid degradation of the wires, or to impart desirable properties to them.

As the wires leave the muffle furnace they pass a temperature sensing system 25 with a multiplexed temperature sensor 26 for the individual wires 11. Signals from the temperature sensors are supplied to a control panel or control system (not shown), at which or with which the temperature of the individual wires may be monitored and recorded. Thus, the maximum temperatures reached by the individual wires in the austenitizing process, i.e. the temperature at which the wires leave the muffle furnace, can be verified to be at or near the desired level and the properties of the wires produced in this system will be uniform and within specifications. However, this is a self regulating system as long as a mass flow of material is maintained, and adjustments are not normally required.

From the muffle furnace 23 the wires pass through a conventional quench unit 27, where the wires are quenched with water, oil or other conventional quenching media to a temperature of about 70 to 160° F., and then pass through a tempering unit 29. In the tempering bath the wires are heated to a temperature of about 600 to 1,200° F. to produce the desired mechanical properties. As mentioned above, the wires are drawn from the tempering unit 29 by conventional take-up reels 15, which also control the speed of the wires through the system. Wire is stored on the take up reels for further processing.

Those skilled in the art of spring steel wire production will readily appreciate the flexibility of operation and other advantages they can obtain through the use of the equipment and techniques described above. They will also appreciate that the specific systems and methods described herein are merely illustrative. Many modifications can be made these systems and methods within the scope of this invention, which is defined by the following claims.

I claim:

1. A method for inductive heating of steel wires comprising simultaneously passing a plurality of said wires through induction coils that are connected in series to a common power supply, with no more than one wire passing through any of said induction coils.

2. A method according to claim 1 wherein each said coil is designed to heat 230 to 250 pounds of wire pre hour to a temperature of 1,375° F.±50° F.

3. A method according to claim 1 wherein wire speed is adjusted as wire diameter changes to maintain a mass thruput of 230–250 Lbs./hr. through each coil.

4. A method according to claim 1 wherein wires are passsed through some of said induction coils, but no wire is passed through at least one of said induction coils.

5. A method according to claim 1 wherein said wires are heated to a temperature between about 1,100 and about 1,400° F.

6. A method according to claim 5 wherein said wires are heated to their Curie temperature.

7. A method according to claim 6 wherein at least one of said wires is heated to its Curie temperature before at least one other of said wires is heated to its Curie temperature.

8. A method according to claim 1 wherein said wires are passed through a non-inductive furnace, after passing through said induction coils, and heated in said non-inductive furnace to an austinitizing temperature.

9. A method according to claim 8 wherein said wires are heated to a temperature of about 1,500 to 1,800° F. in said non-inductive furnace.

10. A method according to claim 8 wherein said non-inductive furnace is a muffle furnace.

11. A method according to claim 8, further comprising measuring the temperatures of each of said wires as said wires leave the non-inductive furnace and to verify and record that the proper austinitizing temperature was reached.

12. A continuous process for heat treating steel wires comprising:
   simultaneously passing said wires through an induction furnace wherein said wires pass through induction coils connected in series to a common power supply, with no more than one wire passing through any of said induction coils;
   heating said wires to a temperature of about 1,100 to 1,400° F. in said induction furnace; and then
   passing said wires through a non-inductive furnace and heating said wires to a temperature of about 1,500 to about 1,800° F.

13. A process according to claim 12 wherein at least one of said wire is heated to its Curie temperature in said induction furnace.

14. A process according to claim 13 wherein at least one of said wires is heated to its Curie temperature before at least one other of said wires has been heated to its Curie temperature.

15. A process according to claim 12 further comprising measuring the temperature of each of said wires as said wires leave said non-inductive furnace, and recording these measurements for verification of proper temperature levels.

16. Apparatus for inductive heating of steel wires comprising:
   a power supply;
   a plurality of induction coils connected in series to said power supply; and
   means for simultaneously passing said wires through said coils so that no more than one wire passes through each of said coils.

17. Apparatus according to claim 16 further comprising a non-inductive furnace and means for continuously passing said wires through said induction coils and then through said noninductive furnace.

18. Apparatus according to claim 17 further comprising means for detecting the temperature of each of said wires as said wire leaves said non-inductive furnace to verify the proper temperature and record same.

* * * * *